INVENTORS.
SHIRO AKABORI
YOSHIHARU IZUMI

United States Patent Office 3,203,905
Patented Aug. 31, 1965

3,203,905
METHOD OF PREPARING A RANEY NICKEL-OPTICALLY ACTIVE HYDROXY ACID HYDROGENATION CATALYST
Shiro Akabori and Yoshiharu Izumi, Hyogo-ken, Japan, assignors to Ajinomoto Co., Inc., Tokyo, Japan
Filed Mar. 7, 1963, Ser. No. 263,535
Claims priority, application Japan, Mar. 30, 1962, 37/12,043; Mar. 31, 1962, 37/12,146
3 Claims. (Cl. 252—430)

This invention relates to hydrogenation catalysts, and more particularly to hydrogenation catalysts which specifically promote the formation of one optically active isomer when the hydrogenation product has two enantiomorphic forms.

We have found that optically active hydrogenation products can be prepared in economically significant amounts when the hydrogenation is performed in the presence of Raney nickel modified by pretreatment with optically active hydroxy acids in aqueous solution. The hydroxy acids, and more specifically the aliphatic hydroxy acids, are effective over a wide range of temperatures and hydrogen ion concentrations.

Figure 1:
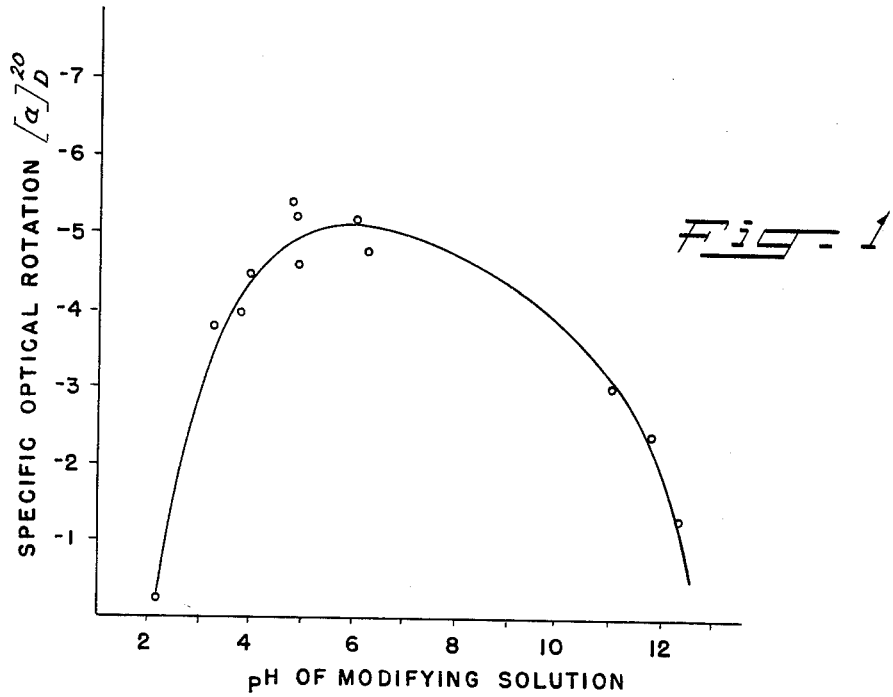
Figure 2:
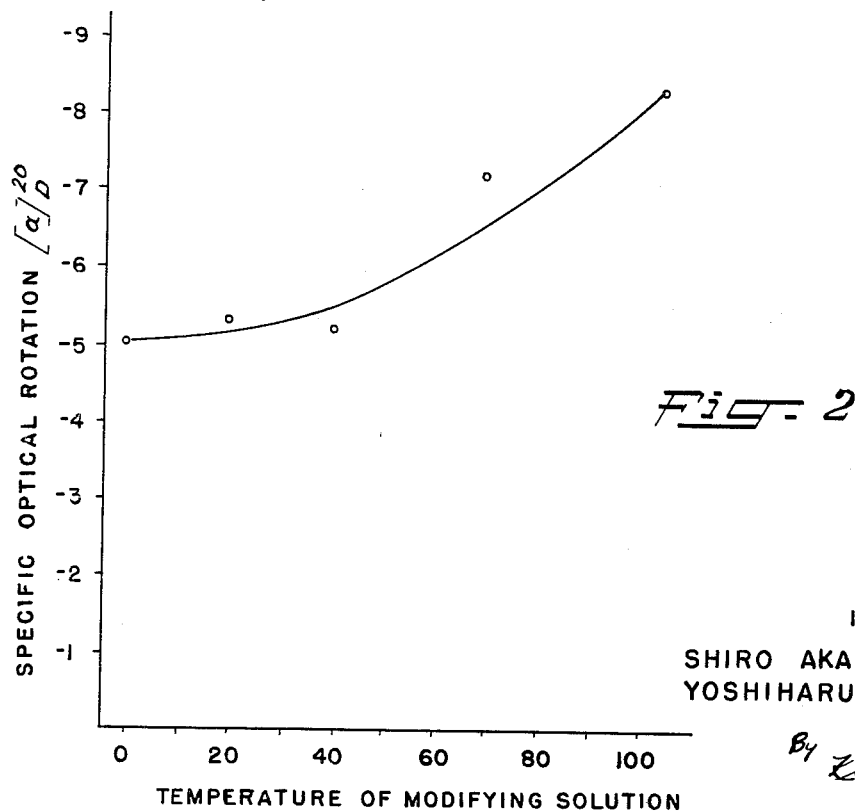

Data on the effects of process variables in the treatment of the Raney nickel on the specific rotation of the hydrogenation product of methyl acetoacetate (methyl beta hydroxy-butyrate) are indicated in the charts of the attached drawing in which:

FIG. 1 shows the relationship of the pH of a hydroxy acid solution on the ability of Raney nickel modified by the solution to promote preferential formation of one optical isomer; and FIG. 2 shows the influence of the temperature of the modifying solution of a hydroxy acid on the catalytic effect of the treated Raney nickel.

The Raney nickel employed as a hydrogenation catalyst is preferably freshly prepared immediately prior to treatment with the optically active hydroxy acid in the usual manner by removing at least a portion of the aluminium from comminuted Raney alloy, an alloy of nickel and aluminum. The aluminum may be removed by reacting the alloy with caustic soda or other alkali in a hot aqueous medium. The Raney nickel so obtained is washed free of alkali and then directly contacted with an aqueous solution of a hydroxy acid.

The following example is further illustrative of the present invention but it will be understood that the invention is not limited thereto.

EXAMPLE 1.5 grams Raney alloy were gradually added over a period of five minutes to a solution of 4.5 grams sodium hydroxide in 18 milliliters water. The mixture was then heated to 80° C. and held at that temperature for one hour. The liquid was decanted from the metallic residue and the latter was washed three times with a total of 50 milliliters distilled water.

The Raney nickel so obtained was stirred with an aqueous solution prepared by dissolving 2.0 grams D-tartaric acid in 100 milliliters water and adding N sodium hydroxide solution to adjust the pH to 5.0. Stirring was continued for 90 minutes while a temperature of 100° C. was maintained. The catalyst so prepared was separated from the liquid by decantation, washed with a total of 100 milliliters distilled water and then with 100 milliliters methanol, and finely separated from the last batch of washing liquid by centrifuging.

The catalyst produced was combined with 19.5 grams methyl acetoacetate and the mixture was treated with hydrogen in an autoclave at 60° C. and at an initial pressure of 90 atmospheres in a conventional manner. When hydrogenation was completed, the reaction mixture was filtered to separate the catalyst therefrom and the filtrate was fractionated in a vacuum. The fraction boiling at 61 to 62° C. at 12 mm. Hg was separately recovered. Its specific optical rotation in a 10 cm. polarimeter tube in the light of the D line of the sodium spectrum was −8.3 degrees.

When employing hydroxy acids, such as optically active tartaric acid or malic acid for treating the catalyst, best results are obtained in a pH range between 3 and 10. The optical activity of the hydrogenation product drops when the pH is higher or lower than this range.

FIG. 1 is a plot of modifying solution pH versus the specific optical rotation of the hydrogenated methyl acetoacetate determined when the pH of the modifying solution of above example was varied by adding more or less sodium hydroxide to a 2 percent solution of D-tartaric acid and the temperature is kept at 0° C. As is evident from FIG. 1, the optical rotation of the methyl beta-hydroxy butyrate reaches a peak between pH 5 and pH 6 of the modifying solution, and drops quite sharply below pH 3 and above pH 10.

The concentration of tartaric acid in the modifying solution was found irrelevant and extremely small amounts of the hydroxy acid were effective. The temperature of the modifying solution was found to affect the results of hydrogenation to a significant degree. The highest optical rotation was obtained in the hydrogenation product when the catalyst employed had been modified at or near the boiling point of the modifying solution containing a hydroxy acid. This is evident from FIG. 2.

When D-tartaric acid was replaced by L-tartaric acid, the hydrogenation product showed an optical activity which was the opposite of that produced with the D-isomer. Not surprisingly, the DL-form was ineffective. Other hydroxy acids, such as malic acid, were effective in substantially the same manner and under the same conditions as tartaric acid. For instance, some results are shown in following table.

Table

| Modifying reagent (g.) | Condition of Treatment | | | | Substrate Me-Aceto-acetate (g.) | $[\alpha]_D^{20}$ of Me 2-hydroxy-butyrate |
|---|---|---|---|---|---|---|
| | pH | Solvent (ml.) | Temp. (0° C.) | Time (hr.) | | |
| L-Malic A. (2.0) | 4.08 | 100 | 0 | 1.5 | 17 | +1.85 |
| Do | 5.22 | 100 | 0 | 1.5 | 17 | +2.35 |
| Do | 5.52 | 100 | 0 | 1.5 | 17 | +2.20 |
| Do | 5.70 | 100 | 0 | 1.5 | 17 | +1.95 |
| Do | 6.30 | 100 | 0 | 1.5 | 17 | +1.68 |
| Do | 5.39 | 100 | 100 | 1.5 | 17 | +4.57 |
| Do | 5.61 | 100 | 100 | 1.5 | 17 | +4.70 |

While the invention has been described with particular reference to specific embodiments, it is to be understood that it is not limited thereto but is to be construed broadly and restricted solely by the scope of the appended claims.

What we claim is:

1. A method of preparing a hydrogenation catalyst which comprises contacting Raney nickel with an aqueous solution of an optically active form of an aliphatic hydroxy acid selected from the group consisting of malic acid and tartaric acid, the pH of said solution being between 3 and 10, and the temperature thereof being between 0° C. and the boiling point of the solution.

2. A method as set forth in claim 1, wherein said acid is tartaric acid.

3. A method as set forth in claim 1, wherein said Raney nickel is freshly prepared from Raney alloy by at least partially removing the aluminum content of said Raney alloy immediately prior to said contacting of the Raney nickel with said aqueous solution of an optically active form of said acid.

References Cited by the Examiner

UNITED STATES PATENTS 2,756,243   7/56   Umhoefer _____ 252—430

OTHER REFERENCES

Accumulatoren-Fabrik, Feb. 28, 1962 (Belgium, abstracted in Chem. Abstracts, vol. 57 (1962). (Col. 10, 572).

Isoda et al.: 54 Chem. Abstracts 287 (1960).

Welch et al.: "Jour. of Physical Chemistry," vol. 65 (1961), pages 705–9.

TOBIAS E. LEVOW, *Primary Examiner.*

SAMUEL H. BLECH, *Examiner.*